(12) United States Patent
Chang

(10) Patent No.: US 6,285,355 B1
(45) Date of Patent: Sep. 4, 2001

(54) MOUSE-ASSOCIATED Z-AXIS ENCODER

(75) Inventor: Douglas Chang, Jong Heh (TW)

(73) Assignee: Key Mouse Electronic Enterprise Co., Chang Hwa (TW)

( * ) Notice: Subject to any disclaimer, the term of this patent is extended or adjusted under 35 U.S.C. 154(b) by 0 days.

(21) Appl. No.: 09/320,249

(22) Filed: May 26, 1999

(51) Int. Cl.$^7$ ..................................................... G09G 5/08
(52) U.S. Cl. ........................................... 345/163; 345/156
(58) Field of Search ..................................... 345/163, 156

(56) References Cited

U.S. PATENT DOCUMENTS

| | | | |
|---|---|---|---|
| 5,530,455 | * 6/1996 | Gillick et al. | 345/163 |
| 5,912,661 | * 6/1999 | Siddiqui | 345/166 |
| 6,014,130 | * 1/2000 | Yung-Chou | 345/163 |
| 6,075,518 | * 6/2000 | Pruchniak | 345/157 |
| 6,157,369 | * 12/2000 | Merminod et al. | 345/157 |
| 6,166,721 | * 12/2000 | Kuroiwa et al. | 345/163 |
| 6,188,389 | * 2/2001 | Yen | 345/156 |
| 6,188,393 | * 2/2001 | Shu | 345/184 |

* cited by examiner

Primary Examiner—Almis R. Jankus
Assistant Examiner—Henry N. Tran

(74) Attorney, Agent, or Firm—Pro-Techtor International Services

(57) ABSTRACT

A mouse-associated Z-axis encoder mainly including a rotary-shaft mount, an encoding disc, and an encoding wheel, and being mounted in a mouse at a position corresponding to a mid-key of the mouse. The rotary-shaft mount has a connection seat provided to an upper portion thereof. A rotary shaft and a plurality of cylindrical sleeves are axially provided on the connection seat. Each of the cylindrical sleeves has a contact finger and an elastic element mounted therein. At least one of the contact fingers is connected to electric signals. The encoding disc is disposed in the encoding wheel so that they are together mounted around the rotary shaft. The encoding wheel is partially protruded from the mouse via the position for the mid-key. There are several series of connected or non-connected conductive contacting areas provided on the surface of the encoding disc. When the encoding wheel is rotated, the contact fingers sequentially and elastically contact with the conductive contacting areas on the encoding disc to generate reference signals for moving the finger post on the Z-axis coordinate. When the encoding wheel is depressed, a lower end of the rotary-shaft mount contacts with and actuates a mid-key switch in the mouse to effectuate the location of the finger post on the Z-axis coordinate.

19 Claims, 11 Drawing Sheets

MOUSE-ASSOCIATED Z-AXIS ENCODER

BACKGROUND OF THE INVENTION

The present invention relates to a mouse-associated Z-axis encoder that may be properly depressed and/or rotated as a mid-key having elastic elements on the mouse to either move or locate a finger post (usually a arrow shown on a screen of a monitor) along a third axis, i.e. the Z-axis coordinate on a computer.

A personal computer is very important in our daily life because it has been widely employed to conveniently process various kinds of information about data exchange, business transaction, and client contact, and do various kinds of complicate works, including word processing, computeraided design, handwriting input, etc. To execute these works on the personal computer, mouse plays a very important role to move and locate the finger post on the computer. For instance, the Windows series products provided by MICROSOFT and the AutoCAD series computer-aided design software provided by AUTODESK all rely on a mouse to move and locate the finger post.

FIG. 11 illustrates a conventional mouse that is mainly used to provide a main frame of a computer with reference signals for moving and locating the finger post along two axes, that is, the X-axis and Y-axis coordinates on a general plane. However, such conventional mouse now fails to satisfy the need of general software designers and computer users. For instance, there are many kinds of software having an environment that requires moving and locating the finger post in a three-dimensional space, such as the above-mentioned AutoCAD series computer-aided design software and many other three-dimensional TV games. Since the conventional mouse can only provide reference signals for moving and locating the finger post along the X and Y axes, it is necessary to use keys on a keyboard or other auxiliary apparatus to simulate or provide reference signals for moving and locating the finger post along a third axis, that is, the Z-axis of a three-dimensional coordinate. To move and/or locate the finger post on a three-dimensional coordinate by operating the keys and/or the auxiliary apparatus is, of course, very inconvenient to users and has poor sensitivity and accuracy. Therefore, it has been a difficult condition in the information industry and many other related industries to move and locate the finger post along a third axis (the Z-axis) coordinate on a computer with the currently available mouse.

It has been tried to incorporate an encoder in the form of a optoelectronic coupler in the conventional mouse shown in FIG. 11 to retrieve reference signals for moving and/or locating the finger post along the Z-axis coordinate. However, this design necessitates wide change in the mechanisms of the conventional mouse and therefore more complicate accessories and circuit design, as well as increased manufacturing cost. Moreover, the conventional Z-axis encoder does not work with keys A1, A2 and A3 or other finger post controlling element originally provided on the conventional mouse. As a matter of fact, there are many difficulties in employing the optoelectronic coupler type encoder to control the finger post via the conventional mouse, and this design is therefore only a product still in the experimental stage and not industrially practical for use.

SUMMARY OF THE INVENTION

It is therefore a primary object of the present invention to provide a mouse-associated Z-axis encoder that is mounted in a mouse at the position corresponding to the mid-key. By easily rotate and/or depress the Z-axis encoder, reference signals for moving and locating the finger post along the Z-axis of a three-dimensional coordinate may be generated and sent to a computer to which the mouse is connected.

Another object of the present invention is to provide a mouse-associated Z-axis encoder that has structurally simple conductive contact fingers to contact with an encoding disc having predetermined series of conductive contacting areas thereon. By rotating the encoding disc, electrical encoding signals in the form of pulse are generated for controlling the finger post on the Z-axis coordinate. The use of the Z-axis encoder of the present invention does not necessitate big change of any old mechanism, circuit and component design in the conventional mouse and is therefore industrially practical for use. To achieve the above and other objects, the mouse-associated Z-axis encoder of the present invention mainly includes a rotary-shaft mount fixed to inside of a conventional mouse at a position corresponding to the mid-key thereof, and an encoding disc disposed in an encoding wheel. The rotary-shaft mount has a connection seat connected to an upper portion thereof. A rotary shaft and a plurality of cylindrical sleeves are axially provided on the connection seat. Each of the cylindrical sleeves has a contact finger and an elastic element around the contact finger disposed therein. At least one of the contact fingers is connected to an electric signal. The encoding disc and the encoding wheel are together mounted around the rotary shaft. The encoding wheel is partially protruded from the mouse at the position of the mid-key. The encoding disc has several series of connected or non-connected conductive contacting areas provided thereon and can be elastically touched by the contact fingers. When the encoding wheel is rotated directly from outside of the mouse, an electrical circuit among the contact fingers generates an electric reference signal for moving and locating the finger post on the Z-axis coordinate directly through the mouse. And, when the encoding wheel is depressed, the rotary-shaft mount is brought downward to touch a mid-key switch in the mouse, so that the movement and location of the finger post along the Z-axis may be effectuated directly at the mid-key position on the mouse.

BRIEF DESCRIPTION OF THE DRAWINGS

The detailed structure and the operation of the present invention may be best understood by referring to the following detailed description of the preferred embodiments and the accompanying drawings, wherein.

DETAILED DESCRIPTION OF THE PREFERRED EMBODIMENTS

Figure 1:
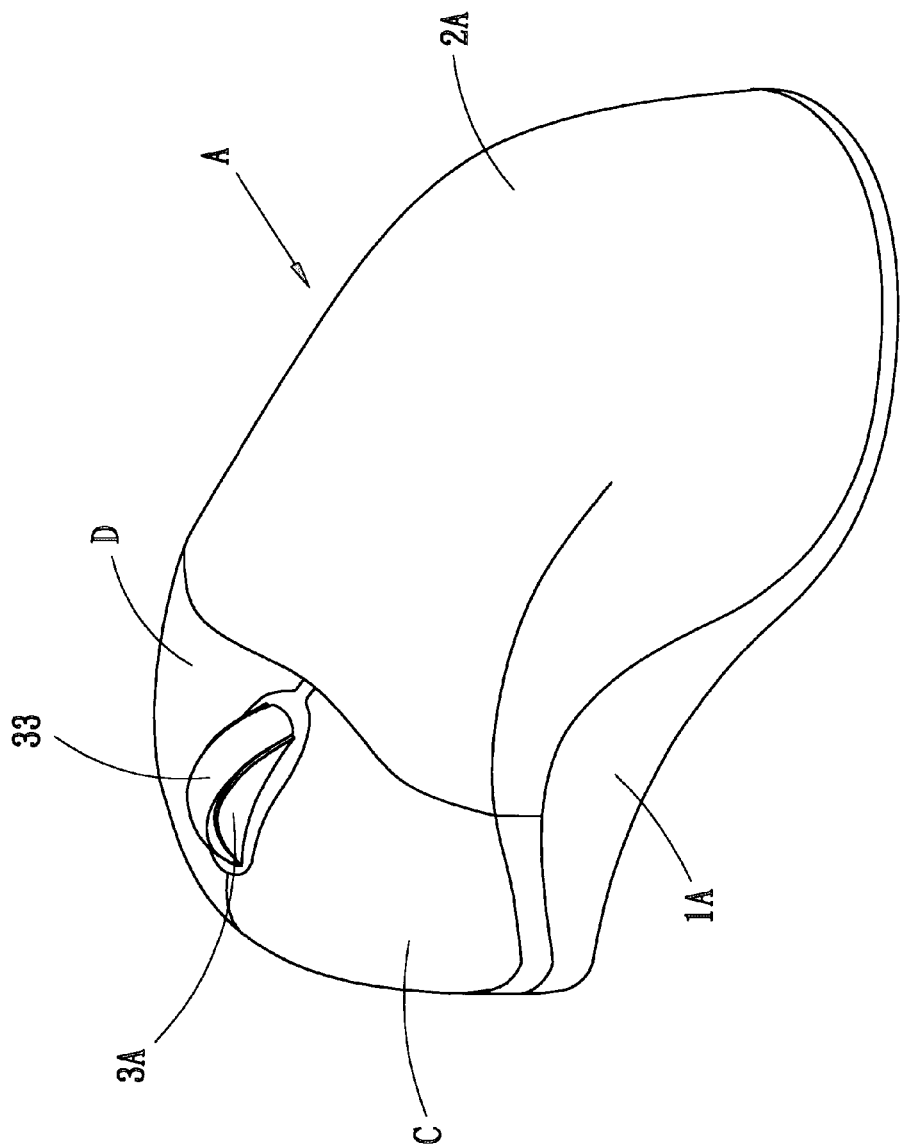
FIG. 1 is a perspective showing a mouse-associated Z-axis encoder according to the present invention.
Figure 2:
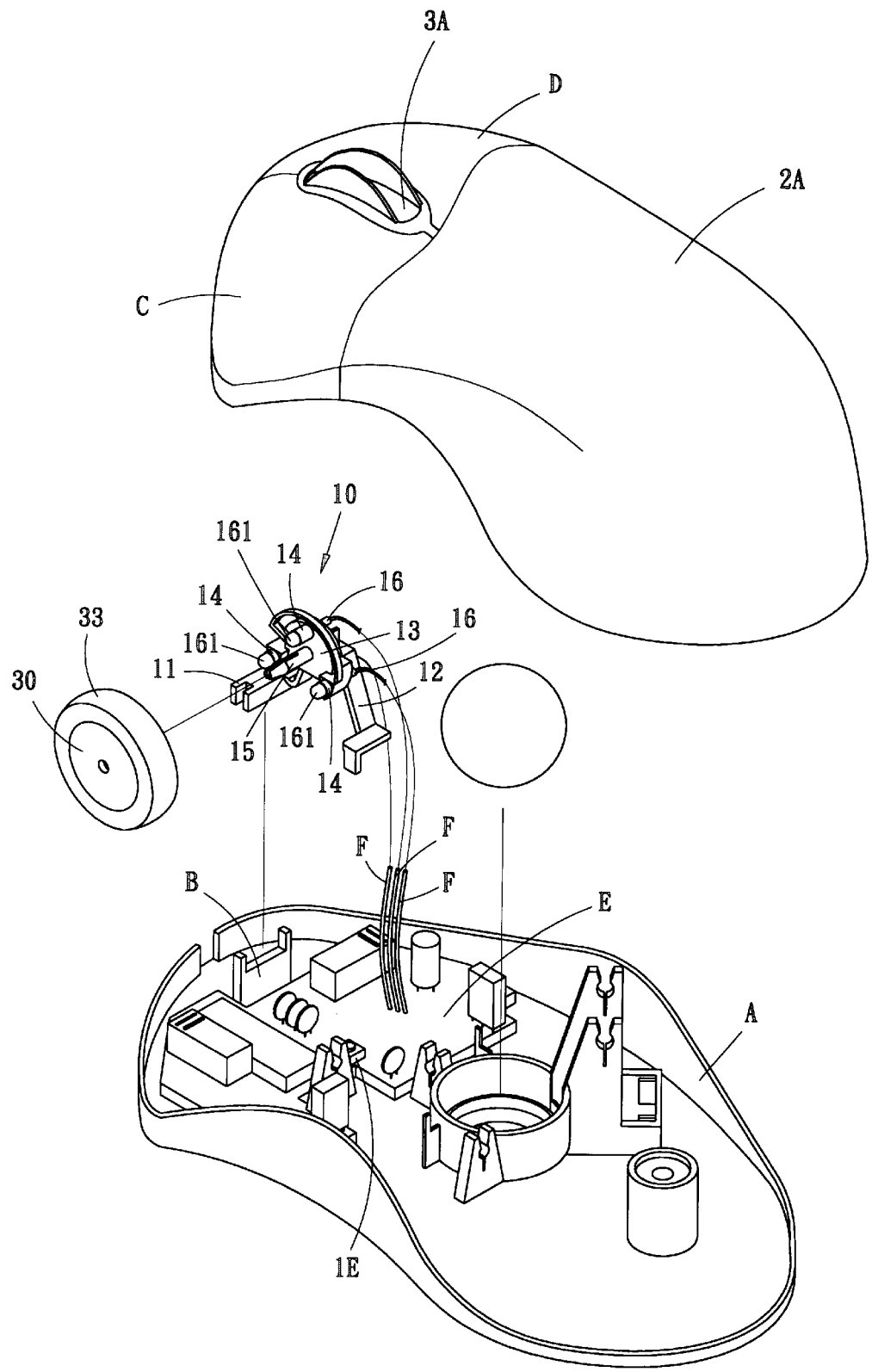
FIG. 2 is a partially exploded perspective of FIG. 1 showing the structure of the mouse-associated Z-axis encoder of the present invention inside the mouse.
Figure 3:
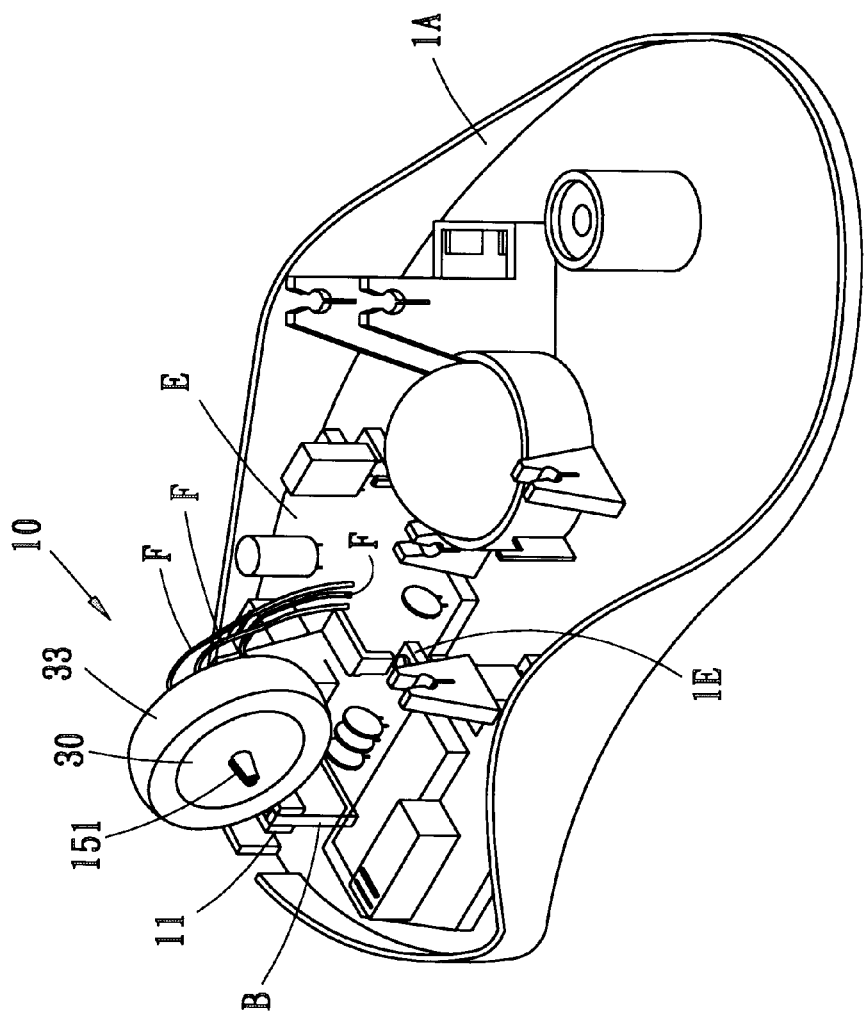
FIG. 3 is a fragmentary perspective of the present invention showing the connection of the mouse-associated Z-axis encoder of FIG. 2 to a circuit base plate inside the mouse.
Figure 4:
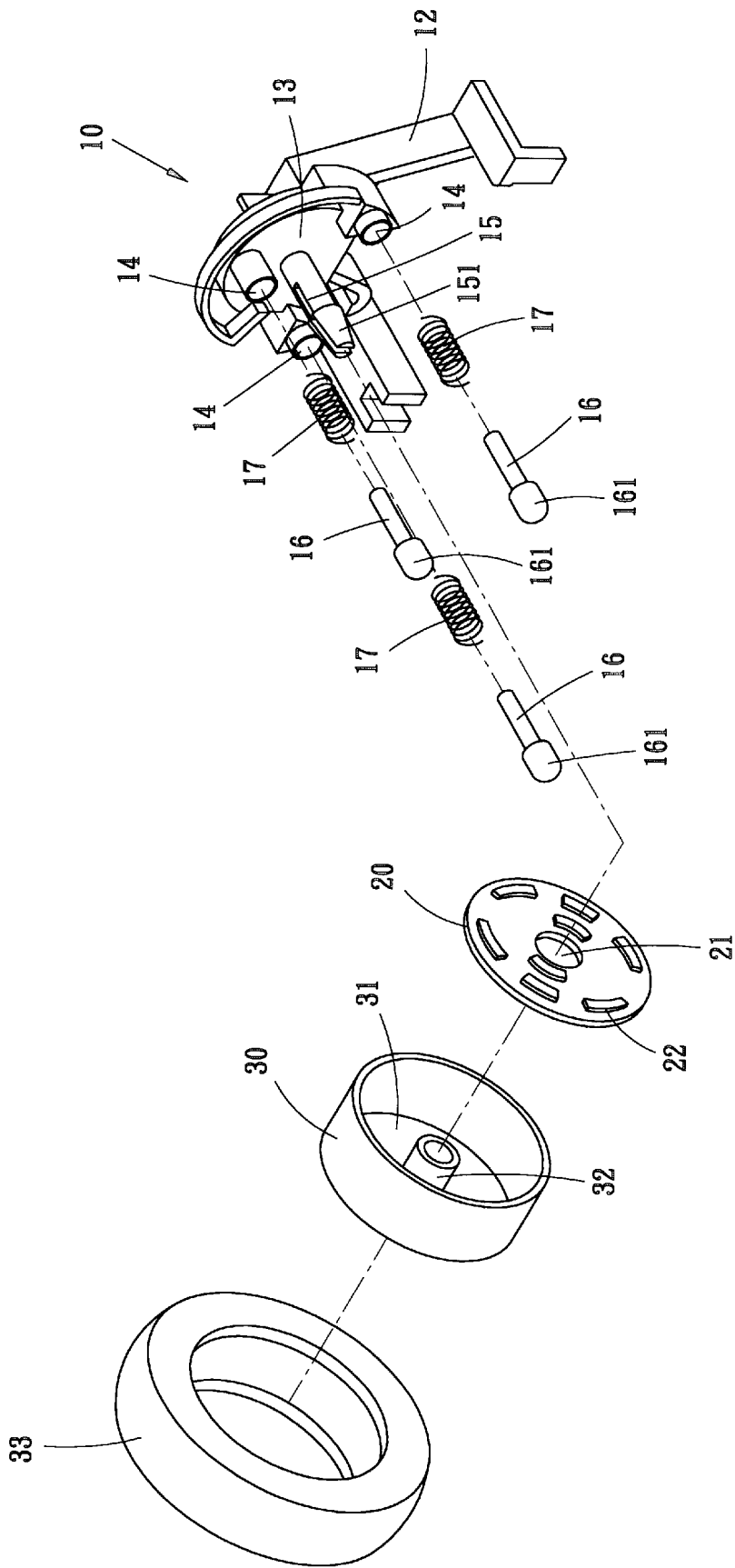
FIG. 4 is a fully exploded perspective of the mouse-associated Z-axis encoder of the present invention.
Figure 5:
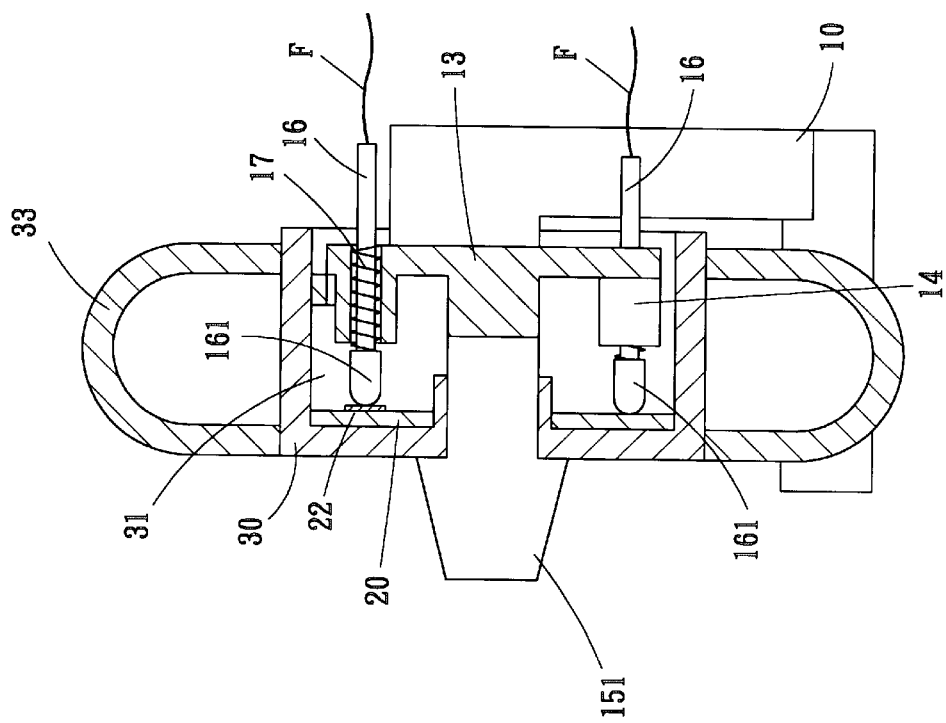
FIG. 5 is an enlarged sectional view showing a contact finger on the rotary-shaft mount in contact with a conductive contact area provided on the encoding disc.

Please refer to FIGS. 1 through 5. The present invention relates to a mouse-associated Z-axis encoder that will be hereinafter briefly referred to as a Z-axis encoder and denoted in all figures by reference numeral 100. As shown, the Z-axis encoder 100 mainly includes a rotary-shaft mount 10 (see FIG. 2). The rotary-shaft mount 10 is provided at one lower side with a fixed leg 11 and at another lower side with a contacting arm 12. The fixed leg 11 is fixedly connected to a predetermined suitable position inside a mouse A. In the illustrated embodiment of the present invention, the fixed leg 11 is connected to a fixed rib B inside a lower case 1A of the mouse A, such that the rotary-shaft mount 10 is just located at an opening 3A preformed on an upper case 2A of the mouse A between a left-key C and a right-key D thereof. That is, the rotary-shaft mount 10 is located at a mid-key position on the upper case 2A of the mouse A. The contacting arm 12 has a free end located just above a mid-key switch 1E on a circuit base plate E inside the lower case 1A of the mouse A.

A connection seat 13 is connected to an upper portion of the rotary-shaft mount 10. The connection seat 13 may be of any shape. In the illustrated embodiment of the present invention, the connection seat 13 is a substantially semi-circular member. A plurality of cylindrical sleeves 14 and a rotary shaft 15 are axially provided on the connection seat 13. The sleeve 14 each defines a space extending through the connection seat 13 (see FIG. 5). The rotary shaft 15 has a split front end forming an expansion conic head 151 that will automatically elastically expand to allow the rotary shaft 15 to tightly locate in a hole. A plurality of contact fingers 16 made of conductive material are separately disposed in the sleeves 14 with their respective front contacting end 161 projected from the sleeves 14. An elastic member 17 is put around each contact finger 16 behind the contacting end 161, so that the elastic member 17 is also located in the sleeve 14 on the connection seat 13. The elastic members 17 allow the connecting rods 16 to elastically move forward or backward within the sleeves 14. The contact fingers 16 are electrically connected to the circuit base plate E in the lower case 1A of the mouse A through conductive wires F (see FIG. 2), so that at least one of the connect fingers 16 is connected via the circuit base plate E to an electric signal or power supply signal for detecting reference signals and encoding purpose.

The Z-axis encoder 100 also includes an encoding disc 20 and an encoding wheel 30. The encoding disc 20 has a central hole 21 and several series of conductive contacting areas 22 arranged on a surface of the encoding disc 20. The conductive contacting areas 22 may be of any shape and may be freely arranged in different ways. In the illustrated embodiment of the present invention, the conductive contacting areas 22 are formed by etching copper foil on a printed circuit board (PCB). The conductive contacting areas 22 may be annularly arranged on the encoding disc 20 into several connected or non-connected concentric circles, depending on the way of encoding for the Z-axis coordinate through the mouse A and the actual need in use. The encoding wheel 30 defines a chamber 31 having a centered shaft sleeve 32. The rotary shaft 15 extends through the central hole 21 of the encoding disc 20 and the centered shaft sleeve 32 of the encoding wheel 30 with the expansion conic head 151 elastically expanded in the shaft sleeve 32 and tightly located thereto. At this point, the conductive contacting areas 22 on the encoding disc 20 and the contacting ends 161 of the contact fingers 16 on the rotary-shaft mount 10 may elastically contact with one another. Moreover, the encoding wheel 30 is fitly disposed in an outer cover 33, so that an operator may rotate the encoding wheel 30 via the outer cover 33. The outer cover 33 has a portion protruded from the hole 3A preformed on the upper case 2A of the mouse A (see FIGS. 1 and 2), so that the encoding wheel 30 may be rotated from outside of the upper case 2A of the mouse A.

Figure 6:
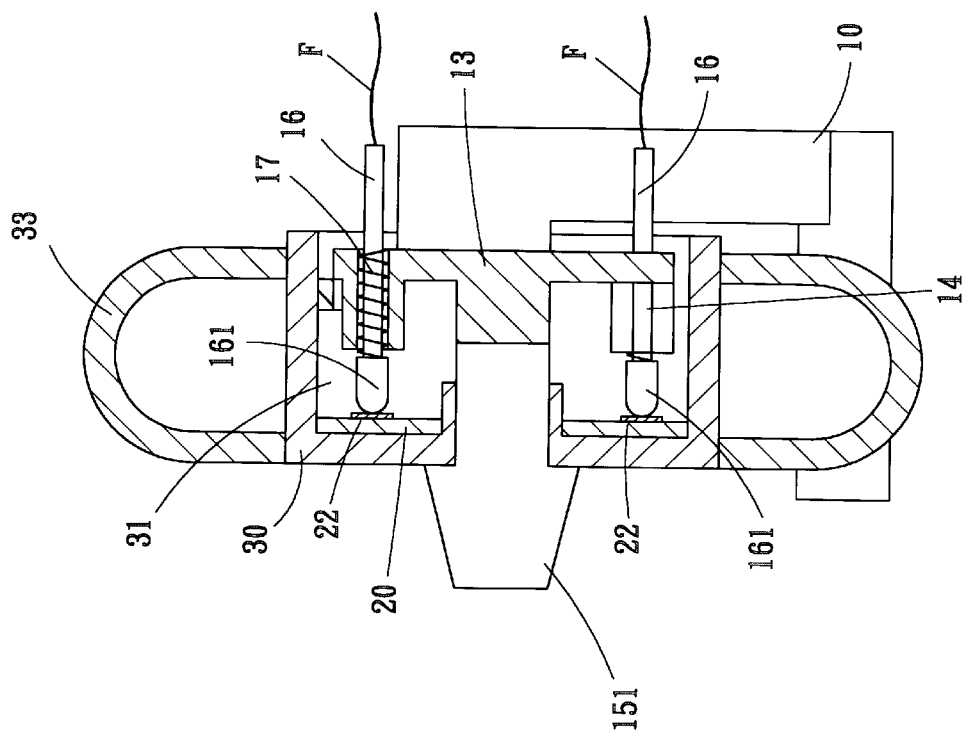
FIG. 6 is another enlarged sectional view showing the contact fingers on the rotary-shaft mount are pushed forward by elastic elements to closely contact the surface of the encoding disc.

Please now refer to FIG. 6 that shows the manner in which the Z-axis encoder 100 illustrated in FIGS. 1 through 5 is operated to effectuate Z-axis encoding. That is, when the outer cover 33 is turned directly from outside of the mouse A to rotate the encoding wheel 30, the encoding disc 20 rotates along with the encoding wheel 30. When the encoding disc 20 rotates, the contacting ends 161 of the contact fingers 16 on the rotary-shaft mount 10 will sequentially contact with different conductive contacting areas 22 or other insulating areas on the encoding disc 20. The elastic elements 17 put around the contact fingers 16 will always push the contacting ends 161 to tightly press against the encoding disc 20. From the contact or non-contact of the contact fingers 16 with the conductive contacting areas 22 on the encoding disc 20, as well as the connection or non-connection of one contacting area 22 to other contacting areas 22, pulse signals of different time sequences may be detected from the electric circuit among the contact fingers 16. The detected pulse signals in turn form equivalent encoding signals for moving and locating the finger post on the Z-axis coordinate. The pulse signals detected from the circuit among the contact fingers 16 are sent to the circuit base plate E inside the mouse A for processing and then sending to a connected computer. Therefore, the mouse A with the Z-axis encoder of the present invention has the ability of implementing the encoding to effectuate movement and location of the finger post on the Z-axis coordinate.

Figure 7:
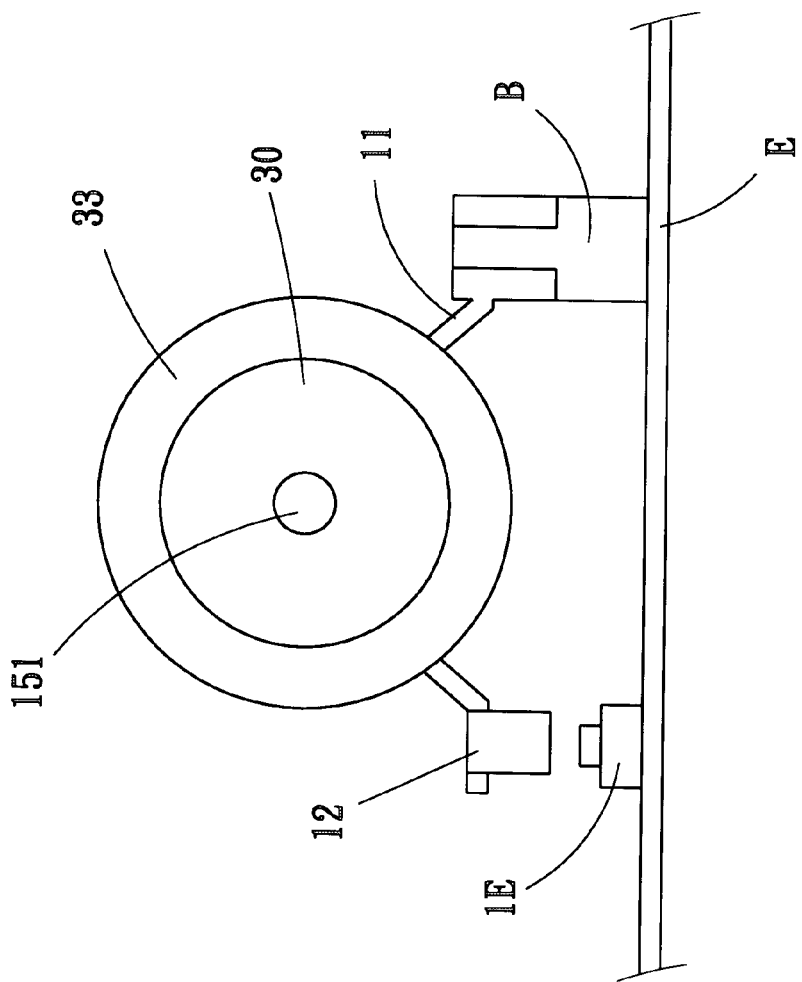
FIG. 7 is a side view showing a contacting arm at one lower side of the rotary-shaft mount is at a position corresponding to a mid-key switch provided on the circuit base plate in the mouse.
Figure 8:
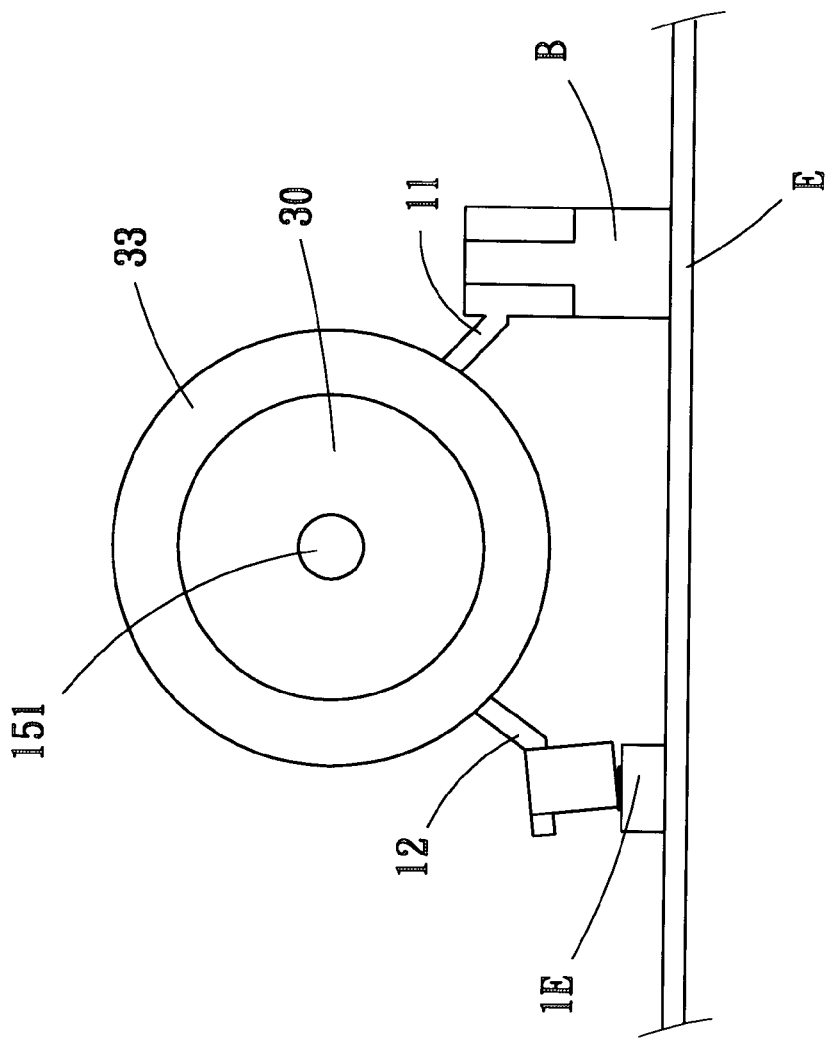
FIG. 8 is a side view showing the encoding wheel is depressed to cause the contacting arm at one lower side of the rotary-shaft mount to press against the mid-key switch on the circuit base plate in the mouse.

FIGS. 7 and 8 explain how the Z-axis encoder 100 of the present invention functions through depressing the outer cover 33 as a mid-key on the mouse A. FIG. 7 shows the encoding wheel 30 in an initial state before being depressed and the contacting arm 12 at one lower side of the rotary-shaft mount 10 is located above without contacting with the mid-key switch 1E on the base plate E inside the mouse A. FIG. 8 shows the outer cover 33 of the encoding wheel 30 is depressed from outside of the mouse A. The force applied on the encoding wheel 30 causes the rotary-shaft mount 10 to elastically bend downward with the fixed leg 11 as a supporting point thereof. At this point, the contacting arm 12 is brought downward by the bent rotary-shaft mount 10 to touch the mid-key switch 1E on the circuit base plate E, so that the mid-key switch 1E is pushed downward to enter an operating state. When the outer cover 33 is released, the rotary-shaft mount 10 automatically springs back to its original position and brings the encoding wheel 30 and the outer cover 33 to their initial position as shown in FIG. 7. At this point, the contacting arm 12 is also brought upward by the rotary-shaft mount 10 to locate directly above the mid-key switch 1E without contacting with it. Therefore, the Z-axis encoder 100 of the present invention serves not only as encoding means for moving the finger post on the Z-axis coordinate, but also as the mid-key of the mouse A. The Z-axis encoder 100 of the present invention is therefore industrially practical for use.

Figure 9:
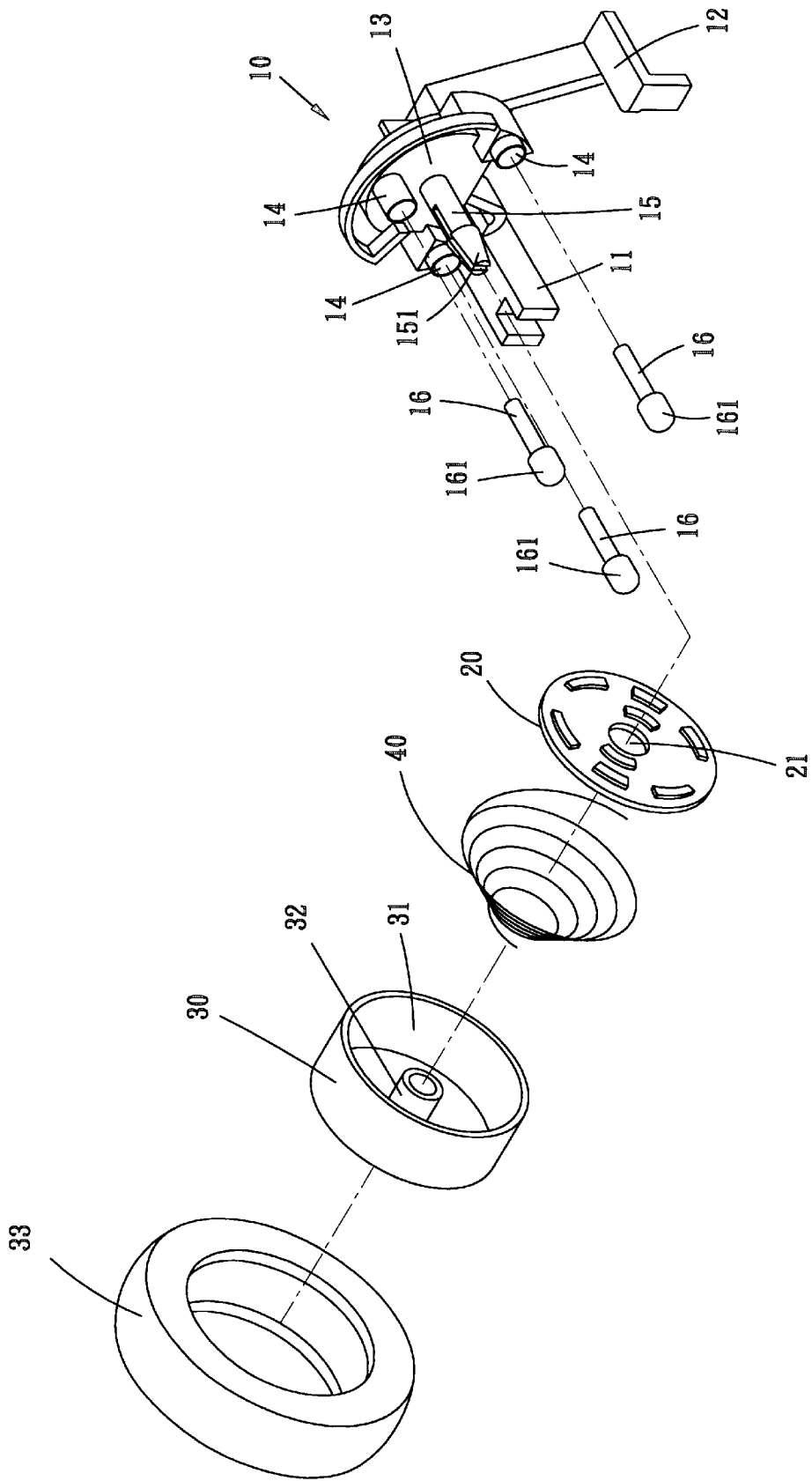
FIG. 9 is an exploded perspective of a mouse-associated Z-axis encoder according to another embodiment of the present invention.
Figure 10:
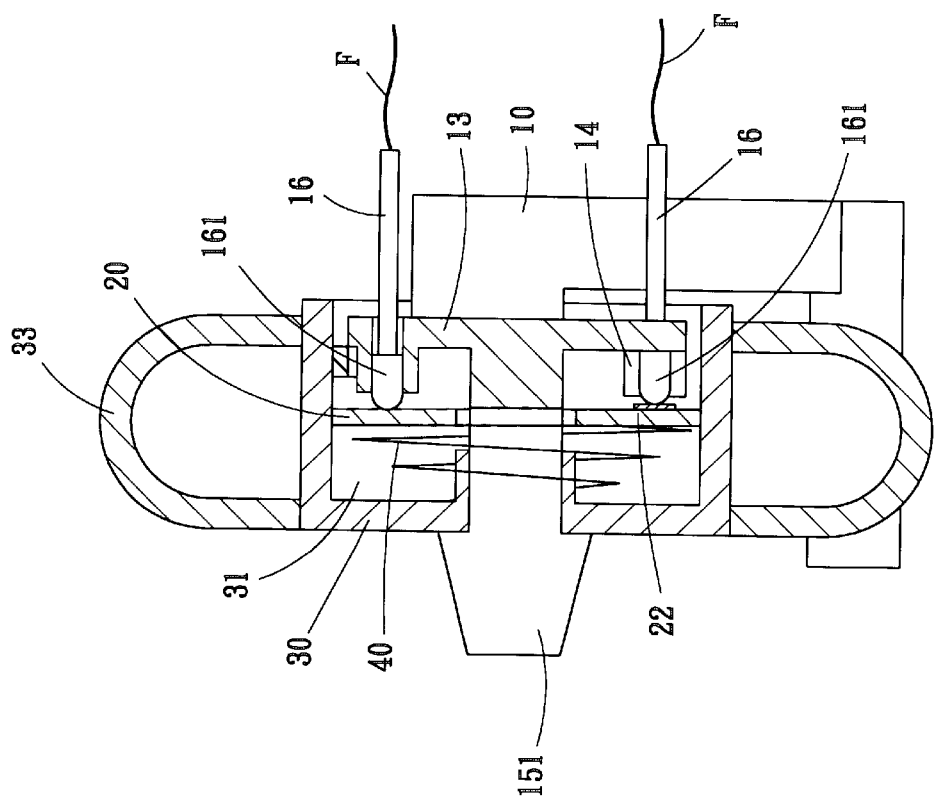
FIG. 10 is an enlarged sectional view of the mouse-associated Z-axis encoder of FIG. 9 showing the encoding disc thereof is pushed by an elastic element to contact with the contact fingers on the rotary-shaft mount.
Figure 11:
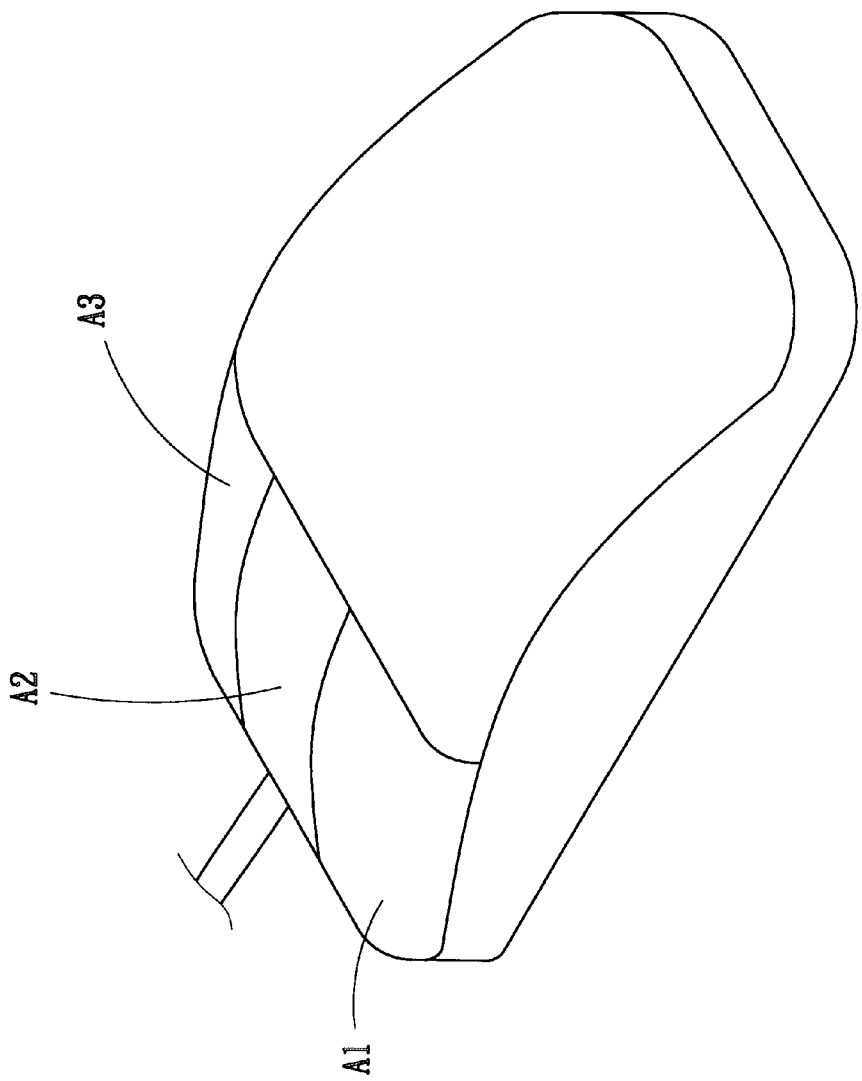
FIG. 11 is a perspective of a conventional mouse.

FIG. 9 is an exploded perspective of a variant of the Z-axis encoder 100 according to the present invention. This variant is structurally similar to the Z-axis encoder 100 shown in FIGS. 1 to 5, except that the elastic elements 17 are removed from the contact fingers 16. Instead, a conical elastic element 40 is disposed in the chamber 31 between the encoding disc 20 and the encoding wheel 30 to normally push the encoding disc 20 outward, so that the surface of the encoding disc 20 having the contacting areas 22 always tightly contacts with the contacting ends 161 of the contact fingers 16, as shown in FIG. 10. In this variant, fewer components are needed to reduce the manufacturing cost of the Z-axis encoder 100 of the present invention.

With the mouse-associated Z-axis encoder 100 of the present invention, it is possible for a mouse having the simplest structure possible to achieve convenient and quick encoding for moving and locating the finger post on the Z-axis coordinate on a computer having software installed for three-dimensional coordinate operation. Meanwhile, the present invention can be incorporated in the conventional mouse without altering the appearance and internal circuits of the mouse. The mouse with the Z-axis encoder 100 of the present invention can therefore be developed and manufactured at reduced cost for wider and advantageous use in industries.

What is to be noted is the form of the present invention shown and disclosed is to be taken as a preferred embodiment of the invention and that various changes in the shape, size, and arrangements of parts may be resorted to without departing from the spirit of the invention or the scope of the subjoined claims.

What is claimed is:

1. A mouse-associated Z-axis encoder for generating electric reference signals for moving and locating a finger post on a computer, comprising:

a rotary-shaft mount fixedly connected to an inner side of a mouse, an encoding disc, and an encoding wheel;

said rotary-shaft mount having a connection seat connected to an upper portion thereof, a rotary shaft and a plurality of cylindrical sleeves being axially provided on said connection seat, each of said cylindrical sleeves receiving a contact finger and an elastic element surrounding said contact finger, at least one of said contact fingers being electrically connected to electric signals;

said encoding disc being disposed in said encoding wheel, said encoding disc and said encoding wheel being mounted around said rotary shaft provided on said rotary-shaft mount;

said encoding wheel having a portion protruding from said mouse, said encoding disc being provided on a surface thereof with a plurality of conductive contacting areas, whereby when said encoding wheel is rotated from a position outside of said mouse, said contact fingers selectively contact said conductive contacting areas on said encoding disc to constitute an electric circuit that generates different electric reference signals for moving and locating the finger post of the computer on a third axis or the Z-axis coordinate.

2. The mouse-associated Z-axis encoder as claimed in claim 1, wherein:

said rotary-shaft mount is provided at a lower side thereof with a fixed leg for fixedly connecting said rotary-shaft mount to said inner side of said mouse.

3. The mouse-associated Z-axis encoder as claimed in claim 2, wherein:

said rotary-shaft mount is fixedly connected inside of said mouse at a position corresponding to a mid-key of said mouse.

4. The mouse-associated Z-axis encoder as claimed in claim 1, wherein:

said rotary-shaft mount is fixedly connected inside of said mouse at a position corresponding to a mid-key of said mouse.

5. The mouse-associated Z-axis encoder as claimed in claim 1, wherein:

said rotary-shaft mount is provided at a lower side with a contacting arm located above a mid-key switch on a circuit base plate inside said mouse, said contacting arm not contacting said mid-key switch in an at-rest position.

6. The mouse-associated Z-axis encoder as claimed in claim 5, wherein:

said contacting arm is brought into contact with said mid-key switch on said circuit base plate of said mouse when said encoding wheel is depressed from outside of said mouse.

7. The mouse-associated Z-axis encoder as claimed in claim 1, wherein:

said connection seat of said rotary-shaft mount is in semi-circular.

8. The mouse-associated Z-axis encoder as claimed in claim 7, wherein:

said cylindrical sleeves on said connection seat each define a space extending through said connection seat.

9. The mouse-associated Z-axis encoder as claimed in claim 1, wherein:

said cylindrical sleeves on said connection seat each define a space extending through said connection seat.

10. The mouse-associated Z-axis encoder as claimed in claim 1, wherein:

said contact fingers mounted in said cylindrical sleeves on said connection seat have a contacting end to contact said encoding disc.

11. The mouse-associated Z-axis encoder as claimed in claim 1, wherein:

said rotary shaft on said rotary-shaft mount has a split on a free end, said split on said free end causing said rotary shaft to be elastically compressible and expandable at said free end.

12. The mouse-associated Z-axis encoder as claimed in claim 11, wherein:

said split free end of said rotary shaft on said rotary-shaft mount is a conic expansion head.

13. The mouse-associated Z-axis encoder as claimed in claim 1, wherein:

said rotary shaft on said rotary-shaft mount has a front end that forms a conic expansion head.

14. The mouse-associated Z-axis encoder as claimed in claim 1, wherein:

said conductive contacting areas on said surface of said encoding disc are formed by etching copper foil on a printed circuit board of said mouse.

15. The mouse-associated Z-axis encoder as claimed in claim 1, wherein:
said encoding wheel defines an internal chamber which receives said encoding disc.

16. The mouse-associated Z-axis encoder as claimed in claim 15, wherein:
said encoding wheel has a shaft sleeve provided in said internal chamber for receiving said rotary shaft.

17. The mouse-associated Z-axis encoder as claimed in claim 15, wherein:
said internal chamber of said encoding wheel has a conical elastic element disposed therein between said encoding wheel and said encoding disc, said elastic element biasing said encoding disc to press against said contact fingers.

18. The mouse-associated Z-axis encoder as claimed in claim 1, wherein:
said encoding wheel is disposed in an outer cover to rotate along with said outer cover.

19. The mouse-associated Z-axis encoder as claimed in claim 1, wherein:
said encoding wheel partially protrudes from said mouse via a hole formed on said mouse at a position corresponding to said mid-key of said mouse.

* * * * *